(12) United States Patent
Chien et al.

(10) Patent No.: US 11,763,761 B2
(45) Date of Patent: Sep. 19, 2023

(54) ELECTRONIC DEVICE WITH AUXILIARY LIGHTING FUNCTION AND OPERATION METHOD THEREOF

(71) Applicants: Po-Yang Chien, Taipei (TW); Hao-Jen Fang, Taipei (TW); Wei-Yi Chang, Taipei (TW); Chun-Chieh Chen, Taipei (TW); Chen-Cheng Wang, Taipei (TW); Chih-Wen Chiang, Taipei (TW)

(72) Inventors: Po-Yang Chien, Taipei (TW); Hao-Jen Fang, Taipei (TW); Wei-Yi Chang, Taipei (TW); Chun-Chieh Chen, Taipei (TW); Chen-Cheng Wang, Taipei (TW); Chih-Wen Chiang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 17/348,767

(22) Filed: Jun. 16, 2021

(65) Prior Publication Data

US 2022/0101804 A1 Mar. 31, 2022

Related U.S. Application Data

(60) Provisional application No. 63/084,567, filed on Sep. 29, 2020.

(51) Int. Cl.
*G09G 3/34* (2006.01)
*G06F 1/3218* (2019.01)
(Continued)

(52) U.S. Cl.
CPC ......... *G09G 3/3426* (2013.01); *G06F 1/3212* (2013.01); *G06F 1/3218* (2013.01);
(Continued)

(58) Field of Classification Search
CPC ................ G09G 3/3426; G09G 5/10; G09G 2320/0626; G09G 2360/144;
(Continued)

(56) References Cited

U.S. PATENT DOCUMENTS 8,884,939 B2 11/2014 Barnhoefer et al.
9,501,103 B2 * 11/2016 Hsu ..................... G06F 13/4081
(Continued)

FOREIGN PATENT DOCUMENTS

CN 110879658 3/2020
TW I569241 2/2017

OTHER PUBLICATIONS

"Office Action of Taiwan Counterpart Application", dated Mar. 9, 2022, p. 1-p. 8.
(Continued)

*Primary Examiner* — Antonio Xavier
(74) *Attorney, Agent, or Firm* — JCIPRNET

(57) ABSTRACT

An electronic device with auxiliary lighting function and an operation method thereof are provided. The electronic device includes a first body, a light-emitting module, and a processing module. The first body has a first surface. The light-emitting module is located on the first surface of the first body. The processing module is coupled to the light-emitting module, and is used to determine an operation of a first power supply mode or a second power supply mode according to a current power supply state. When the processing module is operated in the first power supply mode, the processing module dynamically adjusts an auxiliary illumination light provided by the light-emitting module according to a battery power. When the processing module is operated in the second power supply mode, the processing
(Continued)

module dynamically adjusts the auxiliary illumination light provided by the light-emitting module according to a sensing result.

28 Claims, 19 Drawing Sheets

(51) Int. Cl.
*G09G 5/10* (2006.01)
*G06F 1/3212* (2019.01)
*G06V 40/16* (2022.01)

(52) U.S. Cl.
CPC ............... *G06V 40/16* (2022.01); *G09G 5/10* (2013.01); *G09G 2320/0626* (2013.01); *G09G 2360/144* (2013.01)

(58) Field of Classification Search
CPC .......... G09G 2330/021; G09G 2354/00; G06F 1/3212; G06F 1/3218; G06V 40/16
See application file for complete search history.

(56) References Cited

U.S. PATENT DOCUMENTS

| | | | | |
|---|---|---|---|---|
| 9,635,255 | B1* | 4/2017 | Baldwin | H04N 5/2354 |
| 10,204,592 | B1* | 2/2019 | Trim | G06F 1/1601 |
| 10,379,874 | B1* | 8/2019 | Venkatasamy | G06F 1/3212 |
| 10,684,164 | B2 | 6/2020 | Kang | |
| 2008/0165115 | A1* | 7/2008 | Herz | G06F 1/3203 345/102 |
| 2010/0105442 | A1* | 4/2010 | Yoo | H04M 1/72454 455/566 |
| 2013/0057530 | A1* | 3/2013 | Han | G09G 3/3696 345/211 |
| 2014/0063049 | A1* | 3/2014 | Armstrong-Muntner | G03B 9/00 345/619 |
| 2015/0102995 | A1* | 4/2015 | Shen | G09G 5/00 345/156 |
| 2015/0346987 | A1* | 12/2015 | Ren | G09G 3/3406 345/589 |
| 2018/0113501 | A1* | 4/2018 | Iwaki | G06F 3/0488 |
| 2018/0314362 | A1* | 11/2018 | Kim | G06F 3/0488 |
| 2019/0037125 | A1* | 1/2019 | Jiang | H04N 23/71 |
| 2019/0147806 | A1* | 5/2019 | Qiu | G09G 3/3406 345/212 |
| 2020/0045218 | A1* | 2/2020 | Rathour | H04N 5/2351 |
| 2021/0012479 | A1* | 1/2021 | Lopez Gil | G01J 1/0228 |
| 2021/0181826 | A1* | 6/2021 | Kawakita | G06F 3/167 |
| 2021/0181923 | A1* | 6/2021 | Luo | G06F 3/04883 |
| 2021/0360137 | A1* | 11/2021 | Chien | G06F 1/1616 |
| 2022/0090914 | A1* | 3/2022 | Yin | G06V 40/16 |

OTHER PUBLICATIONS

"Office Action of Taiwan Counterpart Application", dated Aug. 19, 2022, p. 1-p. 13.

* cited by examiner

ELECTRONIC DEVICE WITH AUXILIARY LIGHTING FUNCTION AND OPERATION METHOD THEREOF

CROSS-REFERENCE TO RELATED APPLICATION

This application claims the priority benefit of U.S. provisional application Ser. No. 63/084,567, filed on Sep. 29, 2020. The entirety of the above-mentioned patent application is hereby incorporated by reference herein and made a part of this specification.

BACKGROUND OF THE INVENTION

Field of the Invention

The invention relates to an electronic product, and particularly relates to an electronic device with auxiliary lighting function and an operation method thereof.

Description of Related Art

For a general notebook computer, when the user operates the notebook computer for video conference functions and the user's character image is captured via the imaging element of the notebook computer, since the user's current operating environment may have insufficient lighting, the image quality of the character image obtained by the imaging element may not be good. Alternatively, when a user is operating a notebook computer in an under-illuminated environment, the user experiences inconvenience in use due to the insufficient lighting, for example, the keyboard or an object around the computer may not be clearly visible. Therefore, in regards to effectively providing auxiliary lighting, the invention proposes solutions in the following embodiments.

SUMMARY OF THE INVENTION

The invention provides an electronic device with auxiliary lighting function and an operation method thereof that may automatically provide additional auxiliary illumination light when capturing a portrait.

An electronic device with auxiliary lighting function of the invention includes a first body, a light-emitting module, and a processing module. The first body has a first surface. The light-emitting module is located on the first surface of the first body. The processing module is coupled to the light-emitting module, and is used to determine an operation of a first power supply mode or a second power supply mode according to a current power supply state. When the processing module is operated in the first power supply mode, the processing module dynamically adjusts an auxiliary illumination light provided by the light-emitting module according to a battery power. When the processing module is operated in the second power supply mode, the processing module dynamically adjusts the auxiliary illumination light provided by the light-emitting module according to a sensing result.

An operation method of the invention is suitable for an electronic device with auxiliary lighting function. The electronic device includes a first body, a light-emitting module, and a processing module. The operation method includes the following steps: determining to operate a first power supply mode or a second power supply mode according to a current power supply state via a processing module; dynamically adjusting an auxiliary illumination light provided by a light-emitting module according to a battery power via the processing module when the processing module is operated in the first power supply mode; and dynamically adjusting the auxiliary illumination light provided by the light-emitting module according to a sensing result via the processing module when the processing module is operated in the second power supply mode.

Based on the above, the electronic device with auxiliary lighting function and the operation method thereof of the invention may determine the adjustment mode of the auxiliary illumination light according to the current power supply state, so as to provide an adaptive auxiliary illumination effect.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
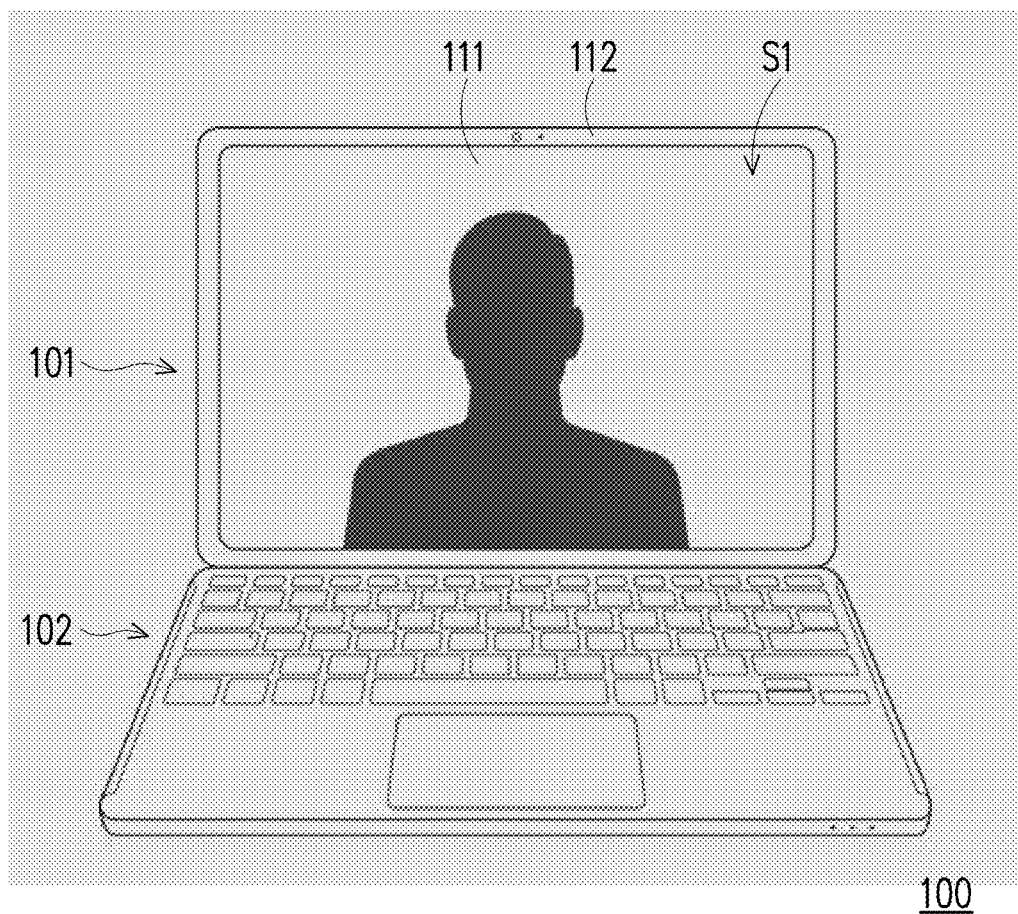
FIG. 1A is a schematic diagram of an electronic device of an embodiment of the invention.

To make the contents of the invention more easily understood, embodiments are provided below as examples of the plausibility of implementation of the disclosure. Moreover, when applicable, devices/components/steps having the same reference numerals in figures and embodiments represent the same or similar parts.

FIG. 1A is a schematic diagram of an electronic device of an embodiment of the invention. Referring to FIG. 1A, an electronic device 100 of the invention may be, for example, a notebook computer, but the invention is not limited thereto. In the present embodiment, the electronic device 100 includes a first body 101 and a second body 102. One side of the first body 101 is pivotally connected to one side of the second body 102. FIG. 1A shows the open state of the first body 101 and the second body 102. In the present embodiment, the first body 101 has a first surface S1 and a second surface. The first surface S1 is located at one side of the first body 101 (for example, the display side of the notebook computer), and the second surface is located at another side of the first body 101 (for example, the LOGO side of the notebook computer). The first surface S1 is parallel to the second surface. The first surface S1 includes a screen area 111 and a border area 112, and the border area 112 surrounds the screen area 111. Those skilled in the art of the invention may easily understand that the display screen is disposed in the screen area 111 of the first body 101, and the border area 112 corresponds to the screen border.

It should be mentioned that, in an embodiment of the invention, the light-emitting module may be a portion of the display screen, and at least a partial area of the light-emitting module of the screen area 111 is divided to be a source providing auxiliary illumination light (auxiliary lighting function). However, in another embodiment of the invention, the light-emitting module may also be an independent light source device, and the light-emitting module may be disposed in the border area 112 of the first body 101 so that the border area 112 is used as a source of auxiliary illumination light (auxiliary lighting function).

Figure 1B:
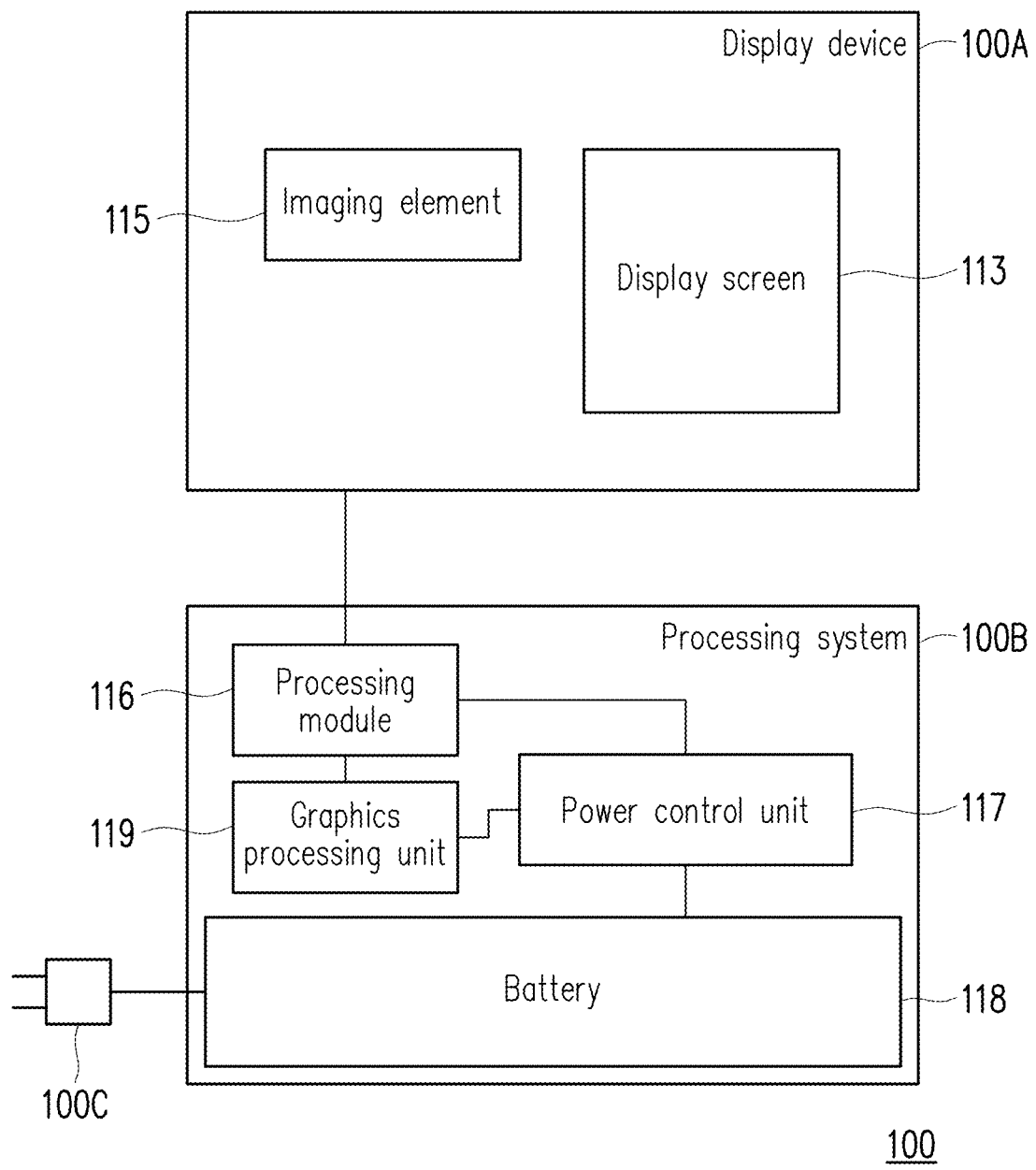
FIG. 1B is a functional block diagram of an electronic device of an embodiment of the invention.

FIG. 1B is a functional block diagram of an electronic device of an embodiment of the invention. Referring to FIG. 1A and FIG. 1B, the electronic device 100 includes a display device 100A and a processing system 100B. The display device 100A may be disposed in the first body 101, and the processing system 100B may be disposed in the second body 102, but the invention is not limited thereto. In some embodiments of the invention, the mounting positions of the display device 100A and the processing system 100B in the electronic device 100 may be determined according to the type of the electronic device 100. In the present embodiment, the display device 100A may include a display screen 113, an imaging element 115 (or photosensitive element), a display driver circuit, and an imaging driver circuit. In the present embodiment, the processing system 100B may include a processing module 116, a power control unit 117, a battery 118, and a graphics processing unit 119. The processing module 116 is coupled (electrically connected) to the display device 100A, the power control unit 117, and the graphics processing unit 119. The power control unit 117 is coupled to the battery 118 and the graphics processing unit 119. The battery 118 may also be coupled to an external power source via a power plug 100C. The processing module 116 is coupled to and controls the display screen 113 and the imaging element 115. The imaging element 115 may be, for example, a camera.

However, in the embodiment of FIG. 1B, the display device 100A may further include a light-emitting module (such as the above independent light source device). The processing module 116 may be coupled to and control the light-emitting module. The light-emitting module may include a light-emitting unit and a related light-emitting driver circuit, wherein the light-emitting unit may, for example, include a plurality of light-emitting diodes (LEDs).

In the embodiment of FIG. 1B, the processing module 116 may, for example, include a central processing unit (CPU) of a notebook computer and/or related processing circuits integrated on the motherboard, and may also control the display screen 113, the imaging element 115, the power control unit 117, and the graphics processing unit 119, wherein the power control unit 117 and the graphics processing unit 119 may include a power control circuit and a graphics processing circuit, respectively. It is worth noting that each functional block and circuit shown in FIG. 1B may be used to implement the related operations described in each embodiment of the invention. In some embodiments of the invention, the power control unit 117 may determine whether the power of the battery 118 is higher than a preset power threshold, so as to implement the auxiliary illumination light described in each embodiment of the invention. Alternatively, the power control unit 117 may determine whether the power plug 100C may receive external power, so as to implement the auxiliary illumination light described in each embodiment of the invention. In the embodiment of FIG. 1B, the graphics processing unit 119 may be used to control the display picture content of the display screen 113 and display a specific picture (for example, a full white picture), and provide the auxiliary illumination light with a higher screen brightness.

Figure 1C:
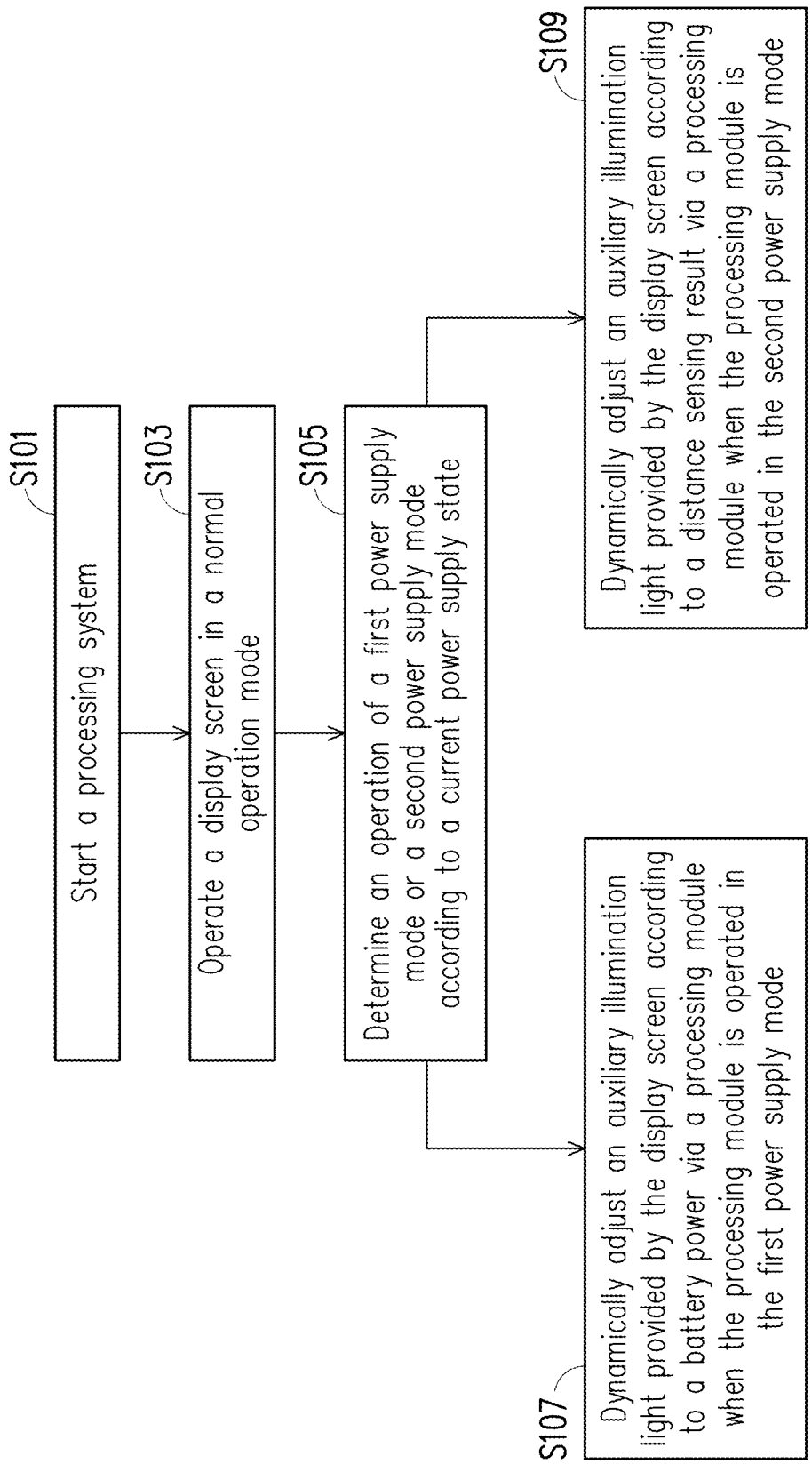
FIG. 1C is a flowchart of an operation method of an embodiment of the invention.

FIG. 1C is a flowchart of an operation method of an embodiment of the invention. Referring to FIG. 1A to FIG. 1C, the processing module 116 of the electronic device 100 may perform the following steps S101, S103, S105, S107, and S109. In the present embodiment, the user turns on the electronic device 100, so that the first body 101 and the second body 102 of the electronic device 100 may be operated in the open state shown in FIG. 1A. In step S101, the processing module 116 starts the processing system 100B of the electronic device 100 (boot operation). In step S103, the processing module 116 operates the display screen 113 in a normal operation mode (or operates the light-emitting module in the off mode). In step S105, the processing module 116 determines the operation of the first power supply mode or the second power supply mode according to the current power supply state. In step S107, when the processing module 116 is operated in the first power supply mode, the processing module 116 dynamically adjusts the auxiliary illumination light provided by the display screen 113 according to the power of the battery 118

(or dynamically adjusts the auxiliary illumination light provided by the light-emitting module). In step S109, when the processing module 116 is operated in the second power supply mode, the processing module 116 dynamically adjusts the auxiliary illumination light provided by the display screen 113 according to the sensing result (or dynamically adjusts the auxiliary illumination light provided by the light-emitting module according to the sensing result).

It should be mentioned that, the current power supply state may mean that the electronic device 100 is operated by an internal power supply provided by the battery 118 or an external power supply provided by the power plug 100C. Alternatively, the current power supply state may also refer to whether the battery 118 has sufficient power. In addition, the sensing result may be, for example, a distance sensing result, an ambient light result, or a portrait ambient light result. For example, the brightness of the auxiliary illumination light provided by the display screen 113 (or the light-emitting module) may be proportional to the distance value of the distance sensing result between the user and the first body 101. Alternatively, the brightness of the auxiliary illumination light provided by the display screen 113 (or the light-emitting module) may be inversely proportional to the intensity value (brightness value) of the ambient light or the intensity value (brightness value) of the portrait ambient light. Therefore, the operation method and the electronic device 100 of the present embodiment may provide an efficient and flexible auxiliary lighting function. Moreover, the ambient light may be obtained by sensing, for example, by a photosensitive element, and the portrait ambient light may be obtained, for example, by analyzing a character image obtained by the imaging element 115 (for example, calculating the brightness degree of the human face in the character image).

Figure 1D:
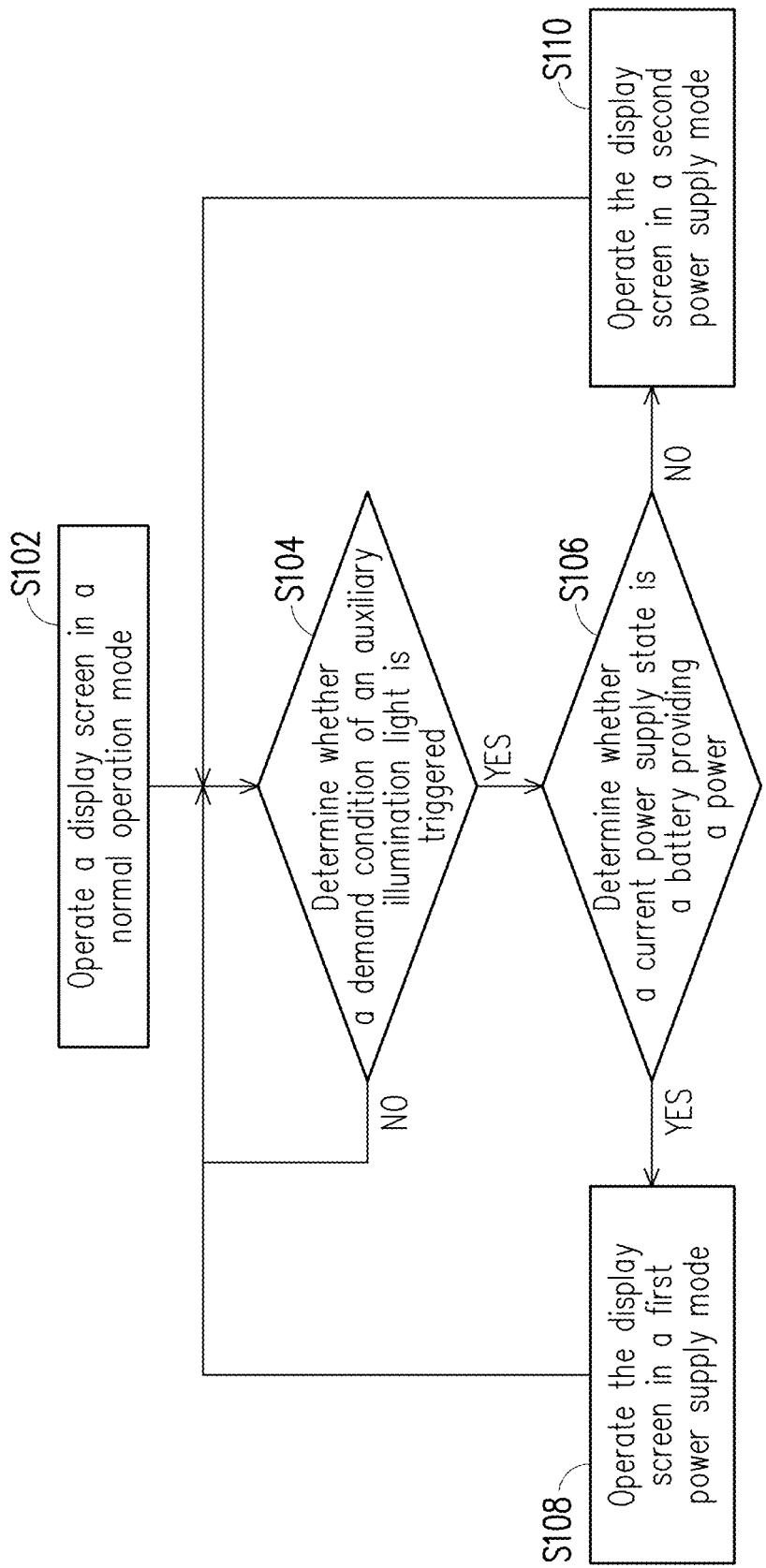
FIG. 1D is a flowchart of an operation method of another embodiment of the invention.

FIG. 1D is a flowchart of an operation method of another embodiment of the invention. Referring to FIG. 1A, FIG. 1B, and FIG. 1D, the auxiliary lighting function of the electronic device 100 of the present embodiment may be passively turned on according to demand conditions, and the first power supply mode or the second power supply mode may be selected to operate according to whether the electronic device 100 is powered by a battery. The processing module 116 of the electronic device 100 may perform the following steps S102, S104, S106, S108, and S110. In step S102, the processing module 116 operates the display screen 113 in the normal operation mode (or operates the light-emitting module in the off mode).

In step S104, the processing module 116 determines whether the demand condition of the auxiliary illumination light is triggered. If not, the processing module 116 may periodically perform step S104. If yes, step S106 is performed, and the processing module 116 continues to determine whether the current power supply state is the battery 118 providing power.

If step S106 is determined to be "Yes", then in step S108, the internal power supply provided by the battery 118 is operated. In step S108, the processing module 116 operates the display screen 113 in the first power supply mode (or operates the light-emitting module in the first power supply mode). If step S106 is determined to be "No", step S110 is performed, and the electronic device 100 is operated by an external power supply provided by the power plug 100C. In step S110, the processing module 116 operates the display screen 113 in the second power supply mode (or operates the light-emitting module in the second power supply mode).

Figures 2A, 2B:
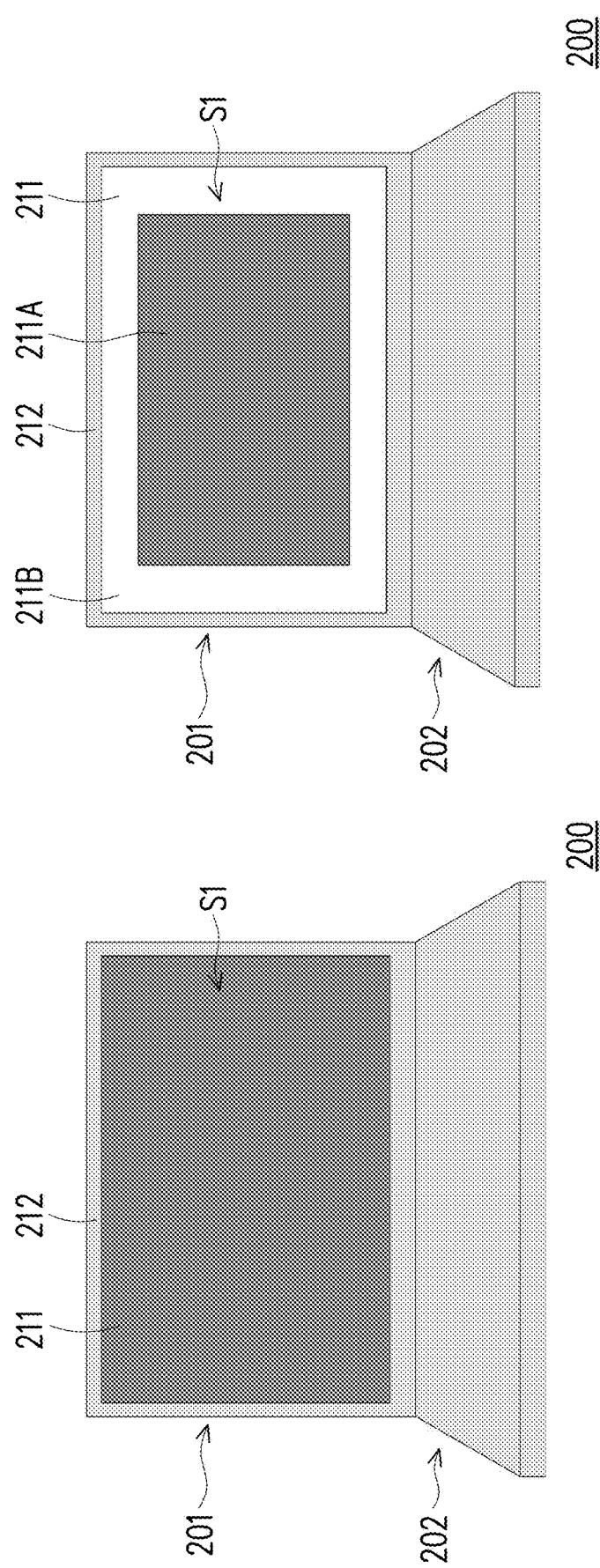
FIG. 2A and FIG. 2B are schematic diagrams of turning on the auxiliary illumination light of the first embodiment of the electronic device of the invention.

FIG. 2A and FIG. 2B are schematic diagrams of turning on the auxiliary illumination light of the first embodiment of the electronic device of the invention. Referring to FIG. 2A and FIG. 2B, an electronic device 200 includes a first body 201 and a second body 202. The first surface S1 of the first body 201 includes a screen area 211 and a border area 212. For related technical features and hardware configuration of the electronic device 200 of the present embodiment, please refer to the description of the electronic device 100 of the embodiment of FIG. 1A and FIG. 1B, which is not repeated herein. The present embodiment is used to explain specific implementations of the display screen operated in the general operation mode and turning on the auxiliary lighting function of the electronic device 200 of an embodiment of the invention. In the first embodiment, the electronic device 200 provides auxiliary illumination light via at least a portion of the display screen provided in the screen area 211. As shown in FIG. 2A, when the display screen is operated in the normal operation mode, the display screen may provide a display picture in the entire area of the screen area 211 (such as OSX® of Macintosh and Windows® of Microsoft and other known operating system pictures). As shown in FIG. 2B, when the electronic device 200 turns on the auxiliary lighting function, the display screen may provide a display picture in a first display area 211A of the screen area 211, and the display screen may provide an auxiliary illumination light in a second display area 211B of the screen area 211. The display screen may, for example, display a full white picture in the second display area 211B, and provide the auxiliary illumination light with a higher screen brightness (for example, higher than the brightness of the first display area 211A), but the invention is not limited thereto. In some other embodiments of the invention, the display screen may display other single-color pictures or multi-color pictures according to different lighting requirements or supplementary light requirements, and provide a colored auxiliary illumination light with higher screen brightness.

Figure 3:
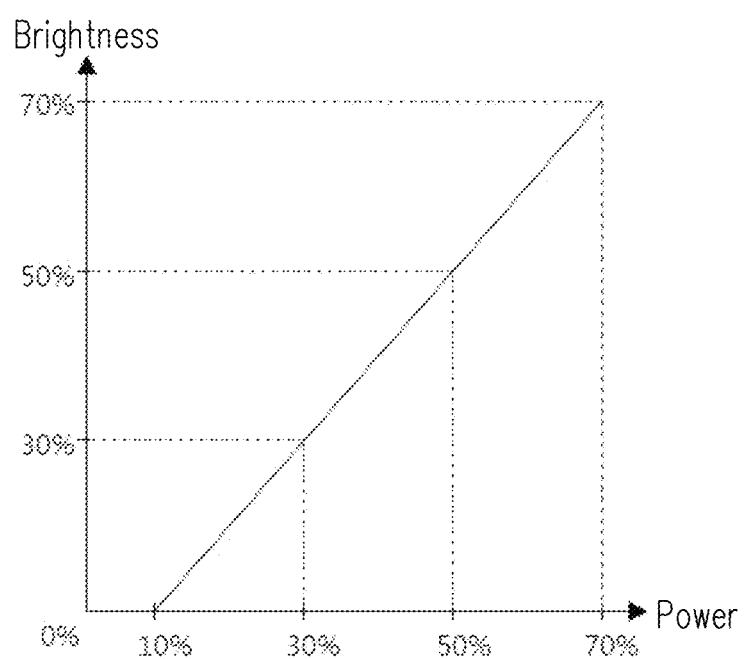
FIG. 3 is a schematic diagram of the relationship between the battery power and the brightness of the auxiliary illumination light in the first power supply mode according to the first embodiment of the invention.

FIG. 3 is a schematic diagram of the relationship between the battery power and the brightness of the auxiliary illumination light in the first power supply mode according to the first embodiment of the invention. Referring to FIG. 2A, FIG. 2B, and FIG. 3, in the present embodiment, the processing module of the electronic device 200 first determines whether the battery power is higher than a preset value (for example, the power is 10%), so as to dynamically adjust the brightness of the auxiliary illumination light provided by the display screen in the second display area 211B. Next, the processing module may dynamically adjust the brightness of the auxiliary illumination light according to the amount of battery power, wherein the amount of battery power is proportional to the brightness of the auxiliary illumination light. For example, as shown in FIG. 3, if the battery power is lower than 100% and higher than 50% (i.e., the power is between 100% and 50%), then the processing module dynamically adjusts the brightness of the auxiliary illumination light provided by the display screen in the second display area 211B to be higher than 50%. If the battery power is higher than 10% and lower than 50% (or the power is between 10% and 50%), then the processing module dynamically adjusts the brightness of the auxiliary illumination light provided by the display screen in the second display area 211B to be lower than 50%. Moreover, if the battery power is less than 10%, the processing module turns off the auxiliary lighting function as shown in FIG. 2A to prevent excessive power consumption and ensure that the electronic device 200 may continue to operate under minimum power.

Moreover, in some other embodiments of the invention, when the processing module of the electronic device 200 is operated in the first power supply mode, and the battery power is higher than 10%, the processing module of the electronic device 200 may dynamically adjust the brightness of the auxiliary illumination light provided by the display screen (or the light-emitting module) according to the battery power and in conjunction with the ambient light result or the portrait ambient light result, and is not limited to the single determining condition shown in FIG. 3 above.

Figure 4B:
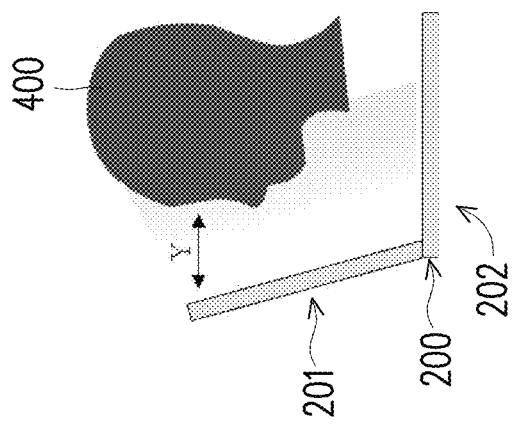
FIG. 4A and FIG. 4B are schematic diagrams of the relationship between the user distance and the brightness of the auxiliary illumination light in the second power supply mode of the first embodiment of the invention.
Figure 4A:
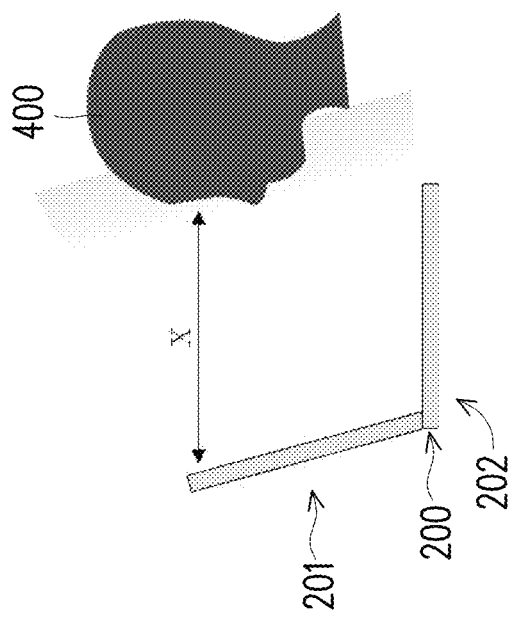

FIG. 4A and FIG. 4B are schematic diagrams of the relationship between the user distance and the brightness of the auxiliary illumination light in the second power supply mode of the first embodiment of the invention. Referring to FIG. 2B, FIG. 4A, and FIG. 4B, in the present embodiment, the processing module of the electronic device 200 may determine the distance value of the distance sensing result between the user 400 and the first body 201 of the electronic device 200, wherein the distance sensing result may be obtained by using an imaging element (with a distance measuring function) or an additional distance sensor. The distance is proportional to the brightness of the auxiliary illumination light. For example, as shown in FIG. 4, when the electronic device 200 determines that the current power supply state is a power plug providing power, the electronic device 200 senses the distance (distance value X) between the user 400 and the first body 201 of the electronic device 200. In this regard, for example, because the distance (distance value X) is farther, the processing module may dynamically adjust the brightness of the auxiliary illumination light provided by the display screen in the second display area 211B to be brighter. In contrast, as shown in FIG. 4B, the electronic device 200 senses the distance (distance value Y) between the user 400 and the first body 201 of the electronic device 200. In this regard, for example, because the distance (distance value Y) is closer, the processing module may dynamically adjust the brightness of the auxiliary illumination light provided by the display screen in the second display area 211B to be darker. Therefore, the electronic device 200 of the present embodiment automatically adjusts the brightness of the auxiliary illumination light in another way when powered by a power plug, so as to avoid the issue of user eye fatigue or glare caused by excessive light supplementation.

Figure 5A:
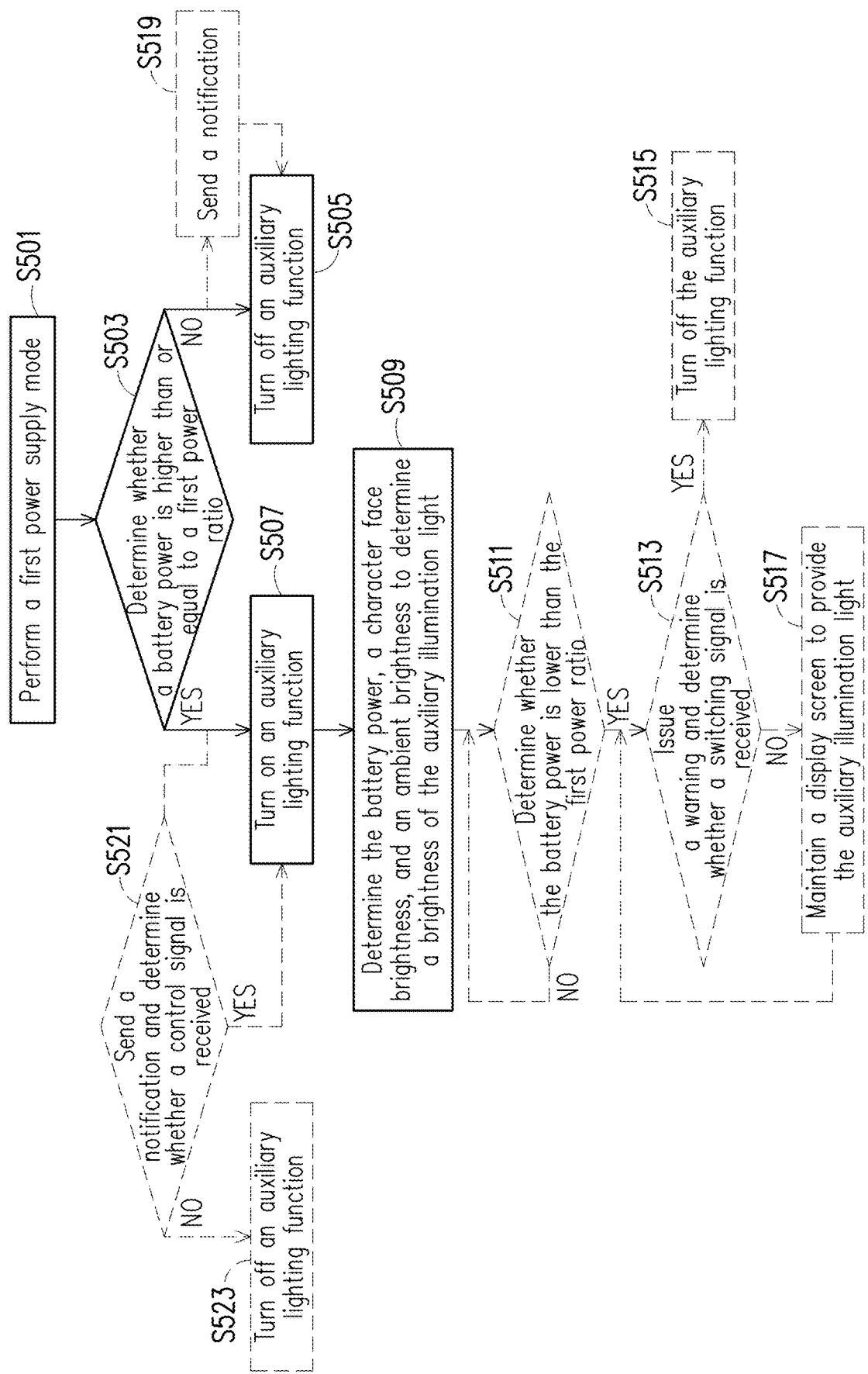
FIG. 5A is a flowchart of operations after entering the first power supply mode of the first and second embodiments of the invention.

FIG. 5A is a flowchart of operations after entering the first power supply mode of the first and second embodiments of the invention. In the first embodiment (the following second embodiment is also applicable), referring to FIG. 2A, FIG. 2B, and FIG. 5A, the electronic device 200 may perform the following steps S501 to S517 to perform the operation in the first power supply mode. In step S501, the processing module of the electronic device 200 performs the first power supply mode. In step S503, the processing module of the electronic device 200 determines whether the battery power is higher than or equal to the first power ratio (for example, 10% in FIG. 3). If the determination in step S503 is "No", then in step S505, the processing module of the electronic device 200 turns off the auxiliary lighting function of the display screen (or the light-emitting module) as shown in FIG. 2A. Moreover, additional steps with user experience may be added, so that the processing module of the electronic device 200 may optionally perform step S519 to send a notification to the user. The notification may be, for example, a notification that the battery power is low or a notification that the auxiliary lighting function is turned off.

If the determination in step S503 is "Yes", then in step S507, the processing module of the electronic device 200 turns on the auxiliary lighting function of the display screen (or the light-emitting module) as shown in FIG. 2B. Furthermore, steps with user experience may be added, so that the processing module of the electronic device 200 may optionally perform step S521 to notify the user in advance and determine whether an externally input control signal is received. The notification may be, for example, a notification that the auxiliary lighting function is turned on. If the determination in step S521 is "No", then in step S523, the processing module of the electronic device 200 turns off the auxiliary lighting function of the display screen (or the light-emitting module) as shown in FIG. 2A. If the determination of step S521 is "Yes", the processing module of the electronic device 200 proceeds to step S507.

Subsequently, in step S509, the processing module of the electronic device 200 may determine the battery power, the character face brightness, and the ambient brightness to determine the brightness of the auxiliary illumination light (comprehensive consideration of the dimming means of the above embodiments). Moreover, in the first power supply mode, the power is depleted under long-term use. Therefore, during the process of the display screen (or the light-emitting module) of the electronic device 200 providing the auxiliary lighting function, the processing module of the electronic device 200 may further optionally perform step S511 to determine whether the battery power is lower than the first power ratio (the battery power is about to be exhausted). If the determination of step S511 is "No", the processing module of the electronic device 200 may repeat step S511 within a preset time interval. If the determination in step S511 is "Yes", then in step S513, the processing module of the electronic device 200 may issue a warning and determine whether a switching signal is received.

If the determination in step S513 is "Yes", then in step S515, the processing module of the electronic device 200 turns off the auxiliary lighting function of the display screen (or the light-emitting module) as shown in FIG. 2A. If the determination in step S513 is "No", then in step S517, the processing module of the electronic device 200 maintains the auxiliary lighting function of the display screen (or the light-emitting module) as shown in FIG. 2B.

Figure 5B:
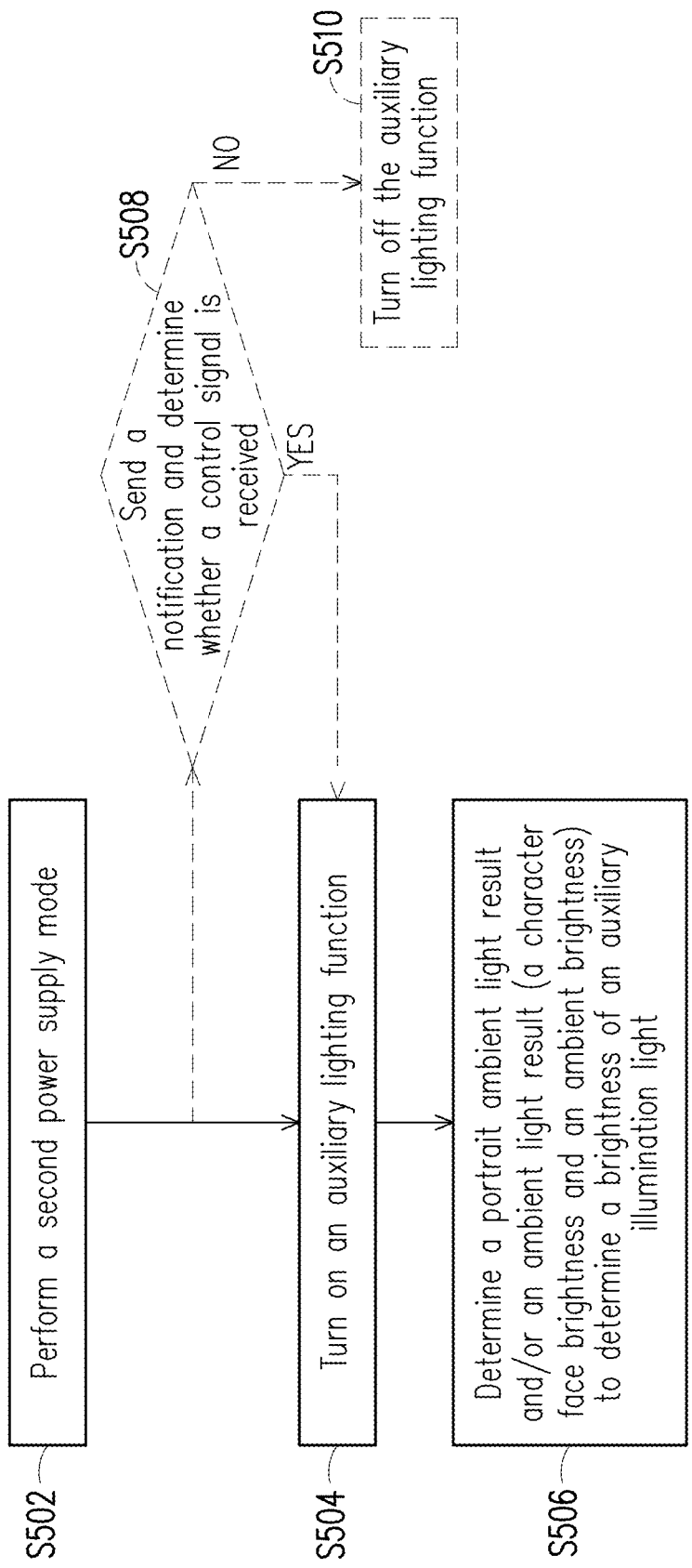
FIG. 5B is a flowchart of operations after entering the second power supply mode of the first and second embodiments of the invention.

FIG. 5B is a flowchart of operations after entering the second power supply mode of the first and second embodiments of the invention. In the first embodiment (the following second embodiment is also applicable), referring to FIG. 2A, FIG. 2B, and FIG. 5B, the electronic device 200 may perform the following steps S502 to S510 to perform the operation in the second power supply mode. In step S502, the processing module of the electronic device 200 performs the second power supply mode. In step S504, the processing module of the electronic device 200 turns on the auxiliary lighting function of the display screen (or the light-emitting module) as shown in FIG. 2B. Furthermore, the operation process of the present embodiment may add additional steps with user experience, so that the processing module of the electronic device 200 may optionally perform step S508 to notify the user and determine whether an externally input control signal is received. The notification may be, for example, a notification that the auxiliary lighting function is turned on. If the determination in step S508 is "No", then in step S510, the processing module of the electronic device 200 turns off the auxiliary lighting function of the display screen (or the light-emitting module) as shown in FIG. 2A.

If the determination of step S508 is "Yes", the processing module of the electronic device 200 performs the above step S504.

In the last step S506, the processing module of the electronic device 200 also determines the portrait ambient light intensity and/or the ambient light intensity to determine the brightness of the auxiliary illumination light. The difference from the first power supply mode is that the second power supply mode has sufficient power supply, so the auxiliary illumination light generally directly presents the effect of optimized brightness, or is supplemented by the above brightness adjustment means of FIGS. 4A to 4B.

Figure 6:
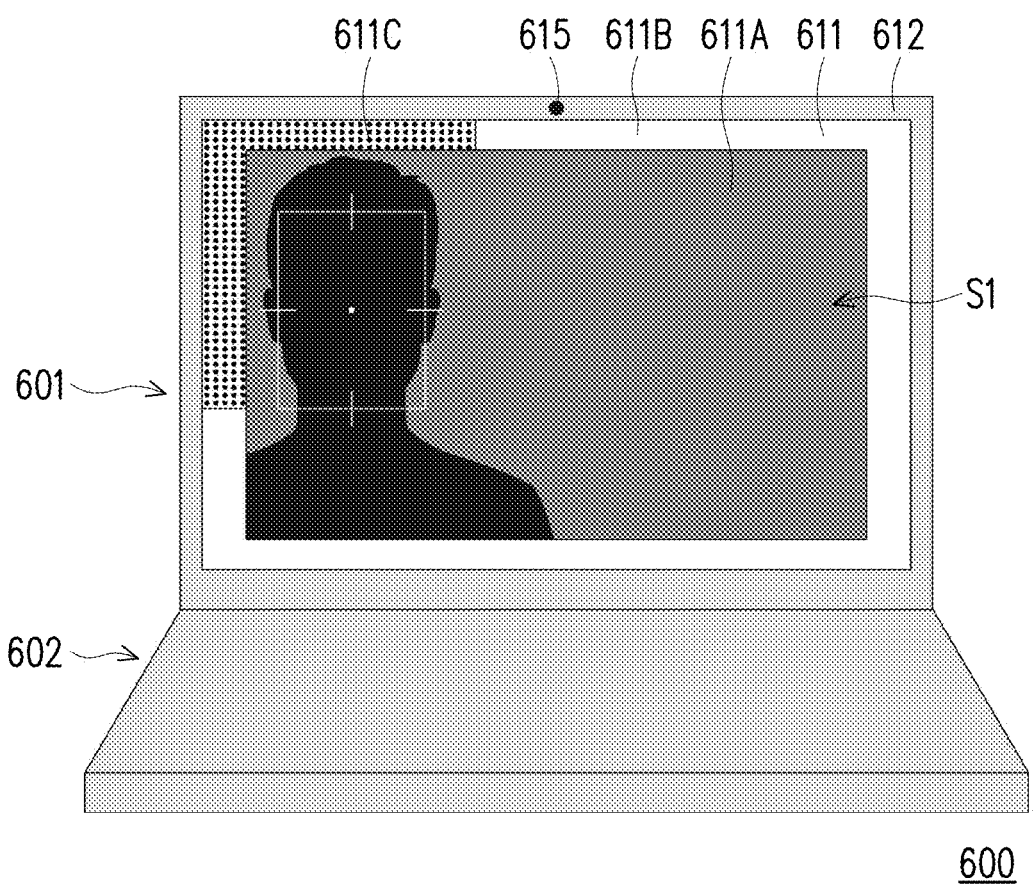
FIG. 6 is a schematic diagram related to adaptively adjusting the light-emitting position of the first embodiment of the invention.

FIG. 6 is a schematic diagram related to adaptively adjusting the light-emitting position of the first embodiment of the invention, which is applicable to the adjustment means of the first and second power supply modes. Referring to FIG. 6, an electronic device 600 includes a first body 601 and a second body 602. The first surface S1 of the first body 601 includes a screen area 611 and a border area 612. When the electronic device 600 turns on the auxiliary lighting function, the display screen may provide a display picture in a first display area 611A of the screen area 611, and the display screen may provide an auxiliary illumination light in a second display area 611B of the screen area 611. For related technical features and hardware configuration of the electronic device 600 of the present embodiment, please refer to the description of the embodiment of FIG. 1A and FIG. 1B, which is not repeated herein. In the present embodiment, the electronic device 600 further includes a sensor 615 (which may be an imaging element or a specially designed face detector). The sensor 615 is coupled to the processing module of the electronic device 600 and is disposed in the border area 612 of the first body 601.

Furthermore, the sensor 615 may sense the object position of a facial object located in front of the first surface S1 of the first body 601, such as a human face, so that the display picture may display a corresponding character image picture. It is worth noting that the processing module may dynamically adjust the luminous intensity of a partial area 611C of the second display area 611B according to the object position. As shown in FIG. 6, when the character image of the user is shifted to one side of the display screen (that is, the face of the user is shifted to one side of the display screen), the processing module may correspondingly strengthen (or reduce) the brightness of the auxiliary illumination light provided by the partial area 611C of the display screen. Therefore, the electronic device 600 of the present embodiment may provide an adaptive auxiliary lighting function by tracking the position of the face of the user to also achieve the effect of saving power (for the first power supply mode) or avoiding excessive light emission and aging (for the second power supply mode) of a certain area of the display screen.

Figure 7A:
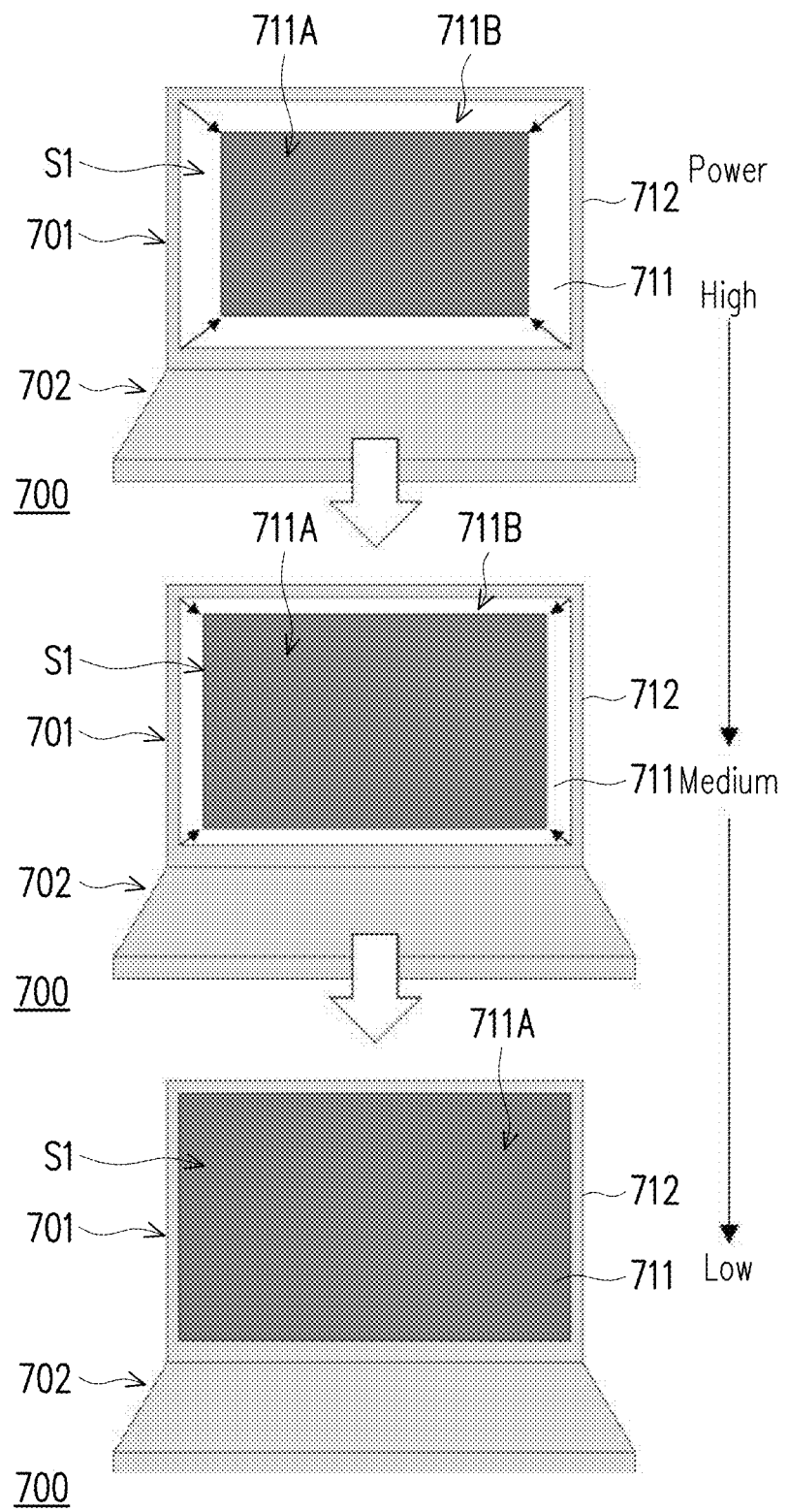
FIG. 7A is a schematic diagram of adjusting the light-emitting area in the first power supply mode of the first embodiment of the invention.
Figure 7B:
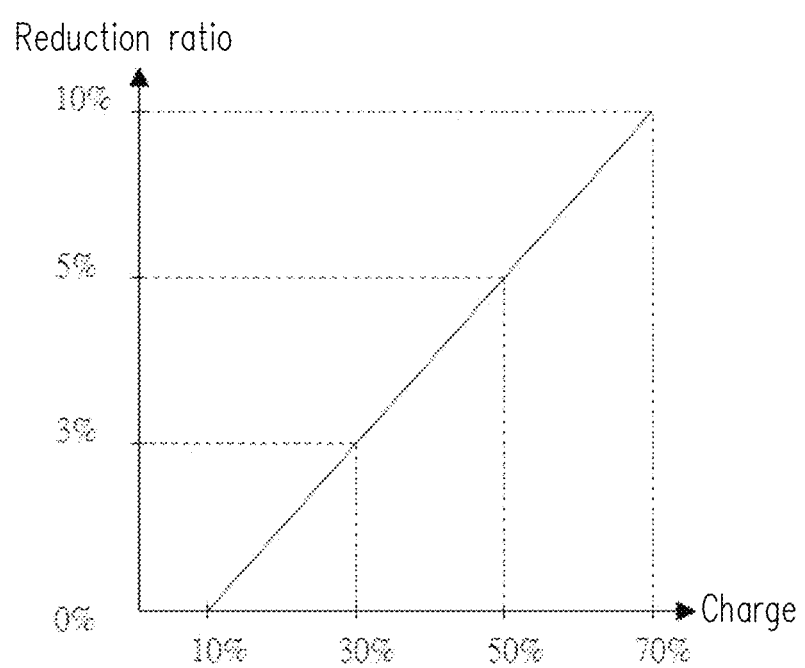
FIG. 7B is a schematic diagram of the relationship between the reduction ratio and the battery power in the first power supply mode of the first embodiment of the invention.

FIG. 7A is a schematic diagram of adjusting the light-emitting area in the first power supply mode of the first embodiment of the invention. FIG. 7B is a schematic diagram of the relationship between the reduction ratio and the battery power in the first power supply mode of the first embodiment of the invention. Referring to FIG. 7A and FIG. 7B, an electronic device 700 includes a first body 701 and a second body 702. The first surface S1 of the first body 701 includes a screen area 711 and a border area 712. When the electronic device 700 turns on the auxiliary lighting function, the display screen may provide a display picture in a first display area 711A of the screen area 711, and the display screen may provide an auxiliary illumination light in a second display area 711B of the screen area 711. For related technical features and hardware configuration of the electronic device 700 of the present embodiment, please refer to the description of the embodiment of FIG. 1A and FIG. 1B, which is not repeated herein. In the present embodiment, when the processing module of the electronic device 700 is operated in the first power supply mode and determines that the battery power is higher than or equal to the first power ratio (for example, 10%), the light-emitting area of the second display area 711B is proportional to the battery power.

For example, the processing module of the electronic device 700 may dynamically adjust the reduction ratio of the first display area 711A according to the amount of battery power. As shown in FIG. 7A and FIG. 7B, when the battery power is higher than 50%, the processing module of the electronic device 700 may determine that the current battery has a higher capacity. Therefore, the processing module of the electronic device 700 may control the reduction ratio of the first display area 711A to be 5% to 10% of the overall display area (the total area of the screen area 711), so that the second display area 711B provides a larger light-emitting area. When the battery power is between 30% and 50%, the processing module of the electronic device 700 may determine that the current battery has medium capacity. Therefore, the processing module of the electronic device 700 may control the reduction ratio of the first display area 711A to be 3% to 5% of the overall display area, so that the second display area 711B provides a medium light-emitting area. When the battery power is between 10% and 30%, the processing module of the electronic device 700 may determine that the current battery has lower capacity. Therefore, the processing module of the electronic device 700 may control the reduction ratio of the first display area 711A to be 0% to 3% of the overall display area, so that the auxiliary lighting function of the second display area 711B is turned off to return to FIG. 2A or to provide the smallest light-emitting area. In simple terms, the higher the power, the larger the reduction ratio of the first display area 711A, and the lower the power, the smaller the reduction ratio of the first display area 711A, which may even approach zero.

FIG. 8A to FIG. 8E are a plurality of schematic diagrams of adjusting the light-emitting configuration in the first power supply mode of the first embodiment of the invention. Referring to FIG. 7B and FIG. 8A to FIG. 8E, an electronic device 800 includes a first body 801 and a second body 802. The first surface S1 of the first body 801 includes a screen area 811 and a border area 812. When the electronic device 800 turns on the auxiliary lighting function, the display screen may provide a display picture in a first display area 811A of the screen area 811, and the display screen may provide an auxiliary illumination light in a second display area 811B of the screen area 811. For related technical features and hardware configuration of the electronic device 800 of the present embodiment, please refer to the description of the embodiment of FIG. 1A and FIG. 1B, which is not repeated herein. In the present embodiment, when the processing module of the electronic device 800 is operated in the first power supply mode and determines that the battery power is higher than or equal to the first power ratio (for example, 10%), the number of arrangement positions of the second display area 811B is proportional to the battery power.

Figure 8A:
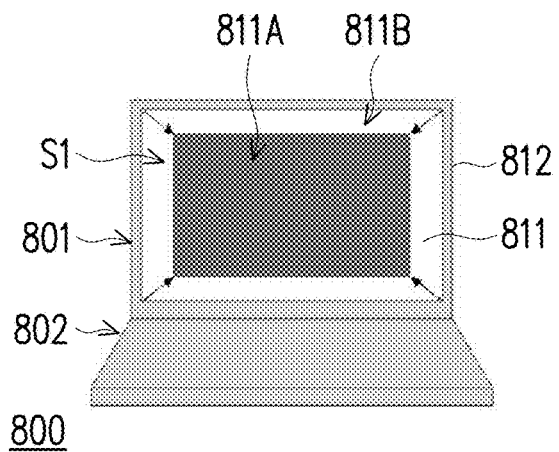
FIG. 8A to FIG. 8E are a plurality of schematic diagrams of adjusting the light-emitting configuration in the first power supply mode of the first embodiment of the invention.

For example, the processing module of the electronic device 800 may dynamically adjust the reduction ratio of the first display area 811A according to the amount of battery power. As shown in FIG. 7B and FIG. 8A, when the battery power is higher than 70%, the processing module of the electronic device 700 may determine that the current battery has a higher capacity. Therefore, the processing module of the electronic device 800 may control the second display area 811B to surround the first display area 811A to achieve the largest light-emitting area. That is, the area of the first display area 811A is reduced more.

Figure 8B:
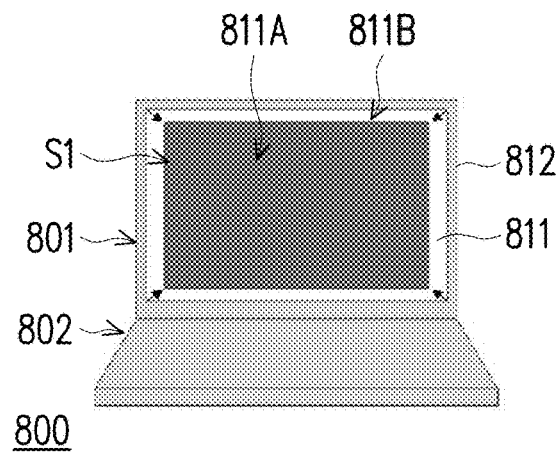

As shown in FIG. 7B and FIG. 8B, when the battery power is between 50% and 70%, the processing module of the electronic device 800 may determine that the current battery has medium capacity. Therefore, the processing module of the electronic device 800 may control the second display area 811B to surround the first display area 811A to achieve a medium light-emitting area. That is, the area of the first display area 811A is reduced a little less.

Figure 8C:
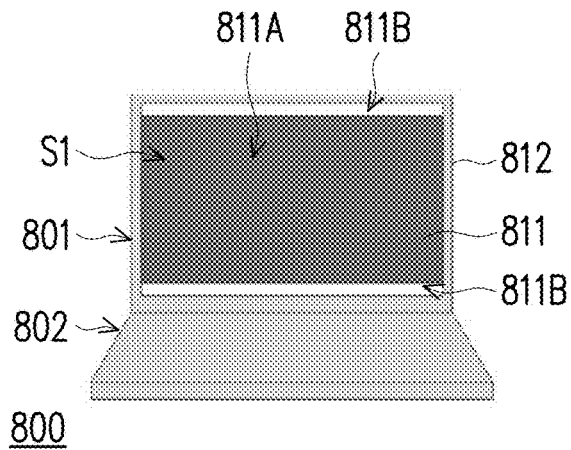

As shown in FIG. 7B and FIG. 8C, when the battery power is between 30% and 50%, the processing module of the electronic device 800 may determine that the current battery has lower capacity. Therefore, the processing module of the electronic device 800 may control the second display area 811B to be located only in the upper and lower sides (may also be the left and right sides) of the first display area 811A to achieve a smaller light-emitting area. That is, the area of the first display area 811A is reduced less.

Figure 8D:
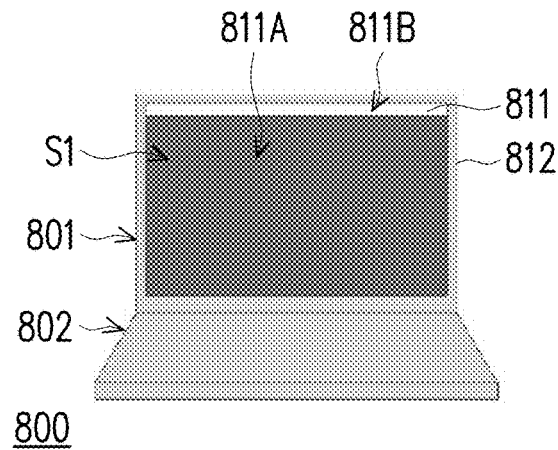

As shown in FIG. 7B and FIG. 8D, when the battery power is between 10% and 30%, the processing module of the electronic device 800 may determine that the current battery has minimum capacity. Therefore, the processing module of the electronic device 800 may control the second display area 811B to be located only in the upper side (may also be the lower side, left side, or right side) of the first display area 811A to achieve a minimum light-emitting area. That is, the area of the first display area 811A is reduced least.

Figure 8E:
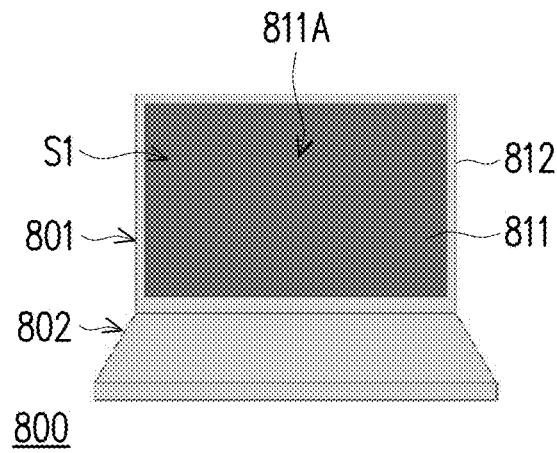

As shown in FIG. 7B and FIG. 8E, when the battery power is less than 10%, the processing module of the electronic device 800 may determine that the current battery has insufficient power, so the processing module of the electronic device 700 may turn off the auxiliary lighting function so that the first display area 811A of the electronic device 800 is equal to the screen area 811 without the second display area 811B. That is, the area of the first display area 811A is not reduced.

Figure 9B:
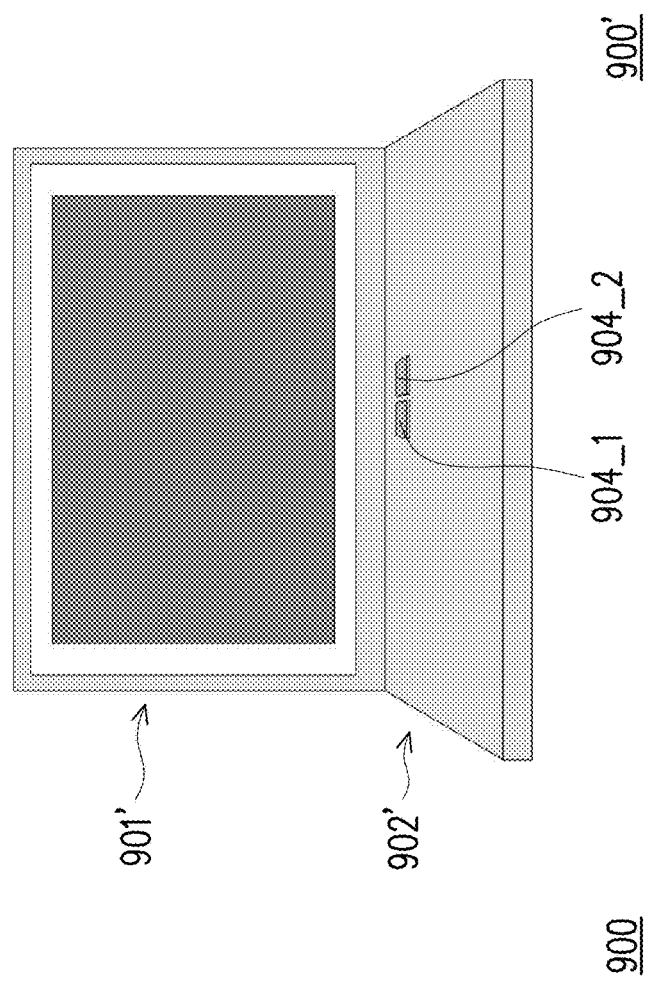
FIG. 9B is a schematic diagram of an electronic device with a dimming button of an embodiment of the invention.
Figure 9A:
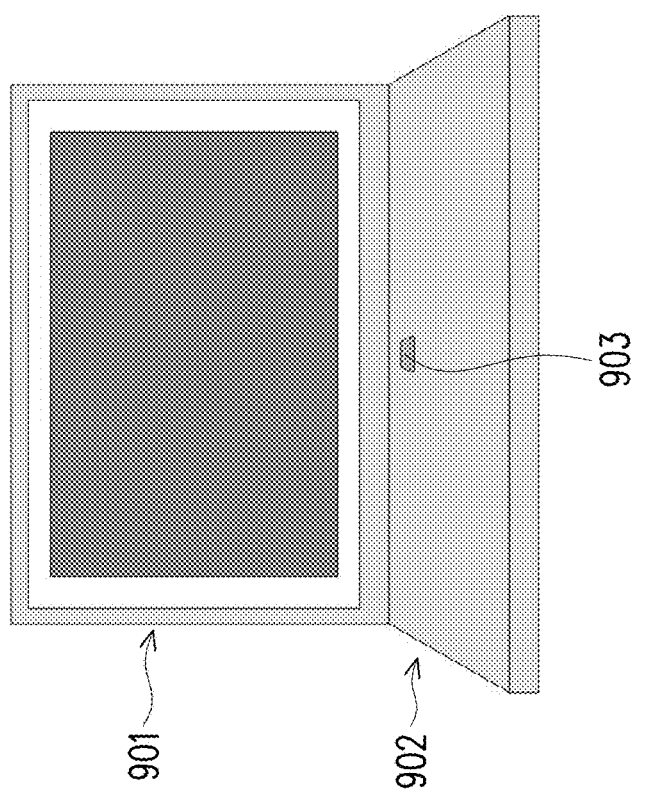
FIG. 9A is a schematic diagram of an electronic device with a switch button of an embodiment of the invention.

FIG. 9A is a schematic diagram of an electronic device with a switch button of an embodiment of the invention. Referring to FIG. 9A, an electronic device 900 includes a first body 901 and a second body 902. For related technical features and hardware configuration of the electronic device 900 of the present embodiment, please refer to the description of the embodiment of FIG. 1A and FIG. 1B, which is not repeated herein. In the present embodiment, the second body 902 of the electronic device 900 includes a switch unit 903. The switch unit 903 is coupled to the processing module and used to provide an enabling signal, wherein the enabling signal may be used as a demand condition for turning on the auxiliary lighting function. In the present embodiment, the user may manually switch the switch unit 903 to output the enabling signal to the processing module to turn on the auxiliary lighting function.

FIG. 9B is a schematic diagram of an electronic device with a dimming button of an embodiment of the invention. Referring to FIG. 9B, an electronic device 900' includes a first body 901' and a second body 902'. For related technical features and hardware configuration of the electronic device 900 of the present embodiment, please refer to the description of the embodiment of FIG. 1A and FIG. 1B, which is not repeated herein. In the present embodiment, the second body 902' of the electronic device 900' may include adjustment units 904_1 and 904_2. The adjustment units 904_1 and 904_2 are coupled to the processing module and may provide at least two adjustment signals. In the present embodiment, the user may generate the at least two adjustment signals via the adjustment units 904_1 and 904_2, so that the processing module may adjust the brightness of the auxiliary illumination light according to the at least two adjustment signals.

Figure 10:
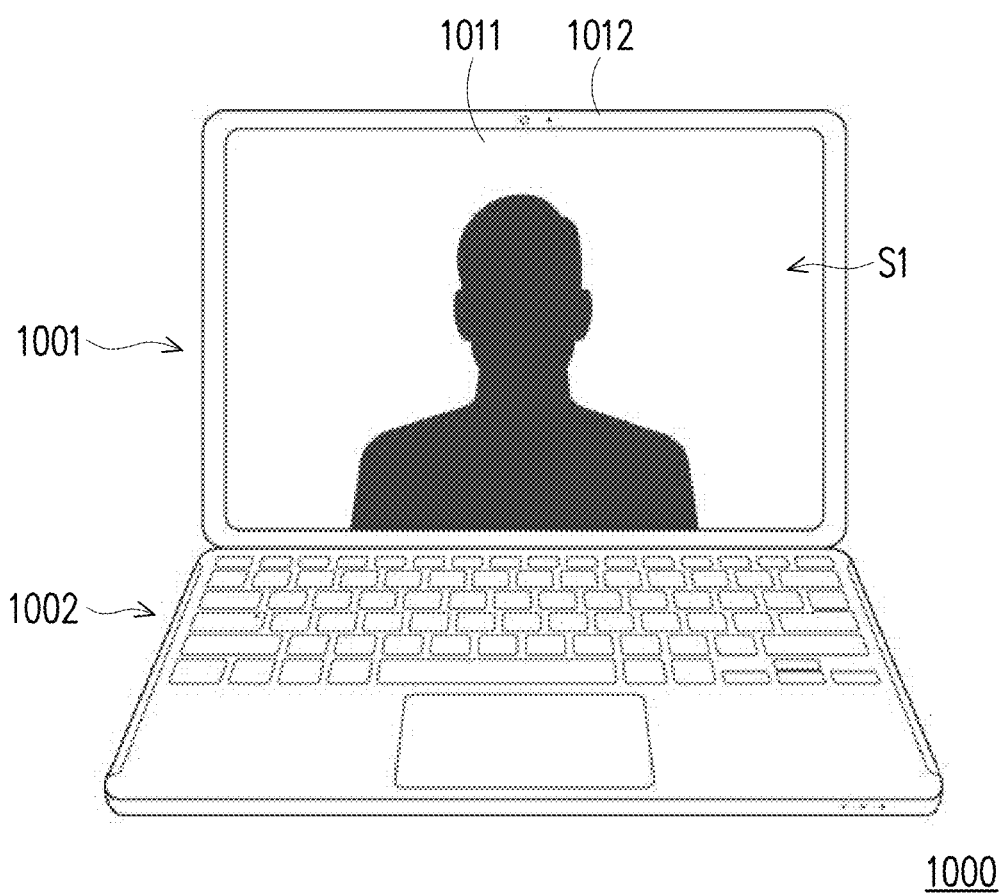
FIG. 10 is a schematic diagram of the second embodiment of the electronic device of the invention.

FIG. 10 is a schematic diagram of the second embodiment of the electronic device of the invention. Referring to FIG. 10, an electronic device 1000 includes a first body 1001 and a second body 1002. The first surface S1 of the first body 1001 includes a screen area 1011 and a border area 1012. In the present embodiment, the display screen may be disposed in the screen area 1011 of the first body 1001. A light-emitting module may be disposed on the inside of the border area 1012 of the first body 1001. The light-emitting module is used to provide an auxiliary illumination light. In the present embodiment, a plurality of light-emitting diodes of the light-emitting unit inside the light-emitting module may be disposed along the border area 1012. The plurality of light-emitting diodes may be, for example, the configuration of a plurality of light-emitting units 1013 of FIG. 11. It should be mentioned that, the electronic device 1000 of the second embodiment may be applied to the operation methods of FIG. 1C, FIG. 1D, FIG. 5A, and FIG. 5B to perform various steps of the first and second power supply modes, which are not repeated herein. The following only describes the different features of the second embodiment that are different from the first embodiment.

Figure 11:
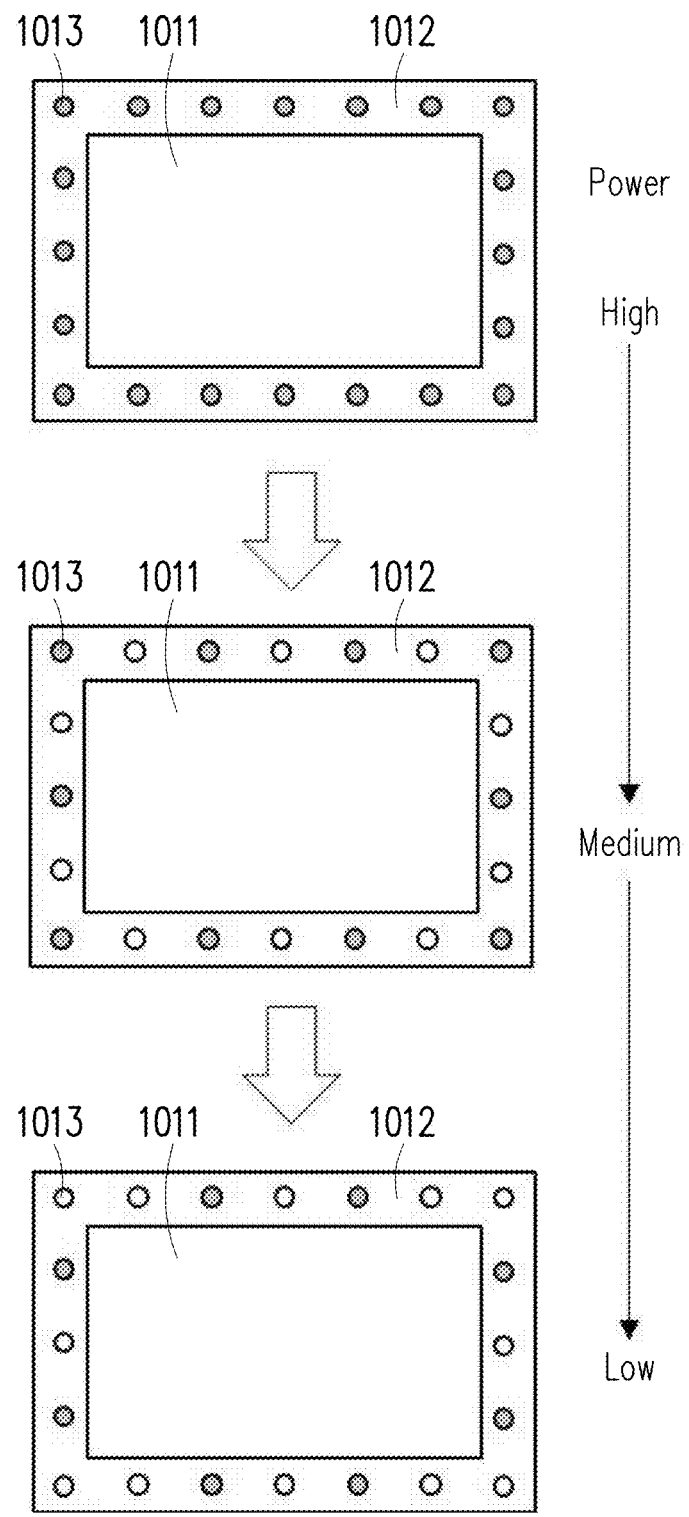
FIG. 11 is a schematic diagram of adjusting the light-emitting ratio of light-emitting units in the first power supply mode of the second embodiment of the invention.
Figure 12:
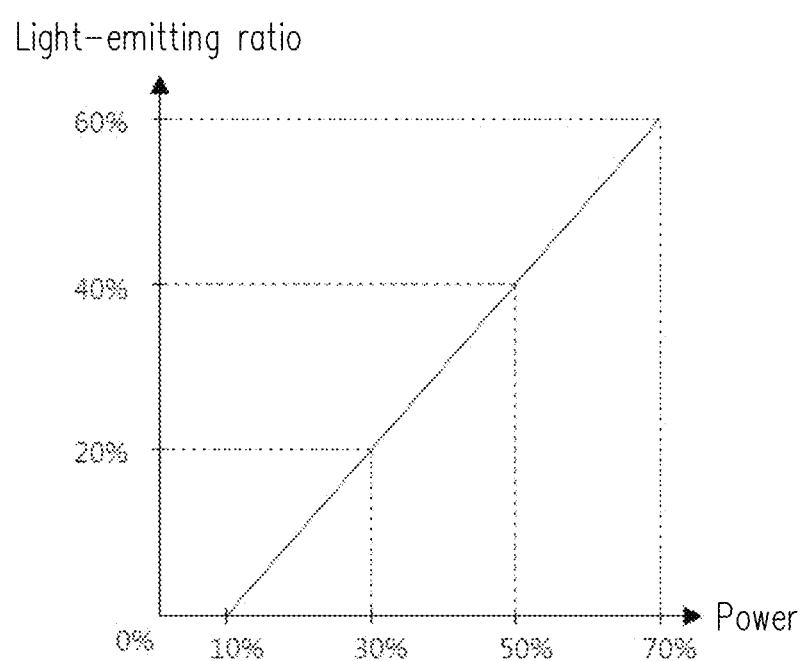
FIG. 12 is a schematic diagram of the relationship between the light-emitting ratio of the first display area and the battery power in the first power supply mode of the second embodiment of the invention.

FIG. 11 is a schematic diagram of adjusting the light-emitting ratio of light-emitting units in the first power supply mode of the second embodiment of the invention. FIG. 12 is a schematic diagram of the relationship between the light-emitting ratio of the first display area and the battery power in the first power supply mode of the second embodiment of the invention. Referring to FIG. 10 to FIG. 12, in the present embodiment, the processing module of the electronic device 1000 may dynamically adjust the light-emitting ratio of the light-emitting unit 1013 according to the amount of battery power. A light-emitting ratio of the light-emitting unit is proportional to the battery power. For example, in the case of "high" power as shown in FIG. 12 and FIG. 11, if the battery power is lower than 100% and higher than 50% (that is, the power is between 50% and 100%), then the processing module of the electronic device 1000 controls all of the light-emitting units of the light-emitting module to be turned on. If the battery power is between 30% and 50%, the processing module of the electronic device 1000 controls the first portion of the plurality of light-emitting units of the light-emitting module to be turned on, as shown in FIG. 11 in the case of "medium" power. If the battery power is between 10% and 30%, the processing module of the electronic device 1000 controls the second portion of the plurality of light-emitting units of the light-emitting module to be turned on, as shown in FIG. 11 in the case of "low" power. The number of light-emitting units turned on in the second portion is less than the number of light-emitting units turned on in the first portion. Moreover, if the battery power is less than 10%, the processing module of the electronic device 1000 turns off all of the light-emitting units of the light-emitting module to prevent the electronic device 1000 from being excessively depleted so as to ensure that the electronic device 1000 may continue to operate with minimum power.

Figure 13:
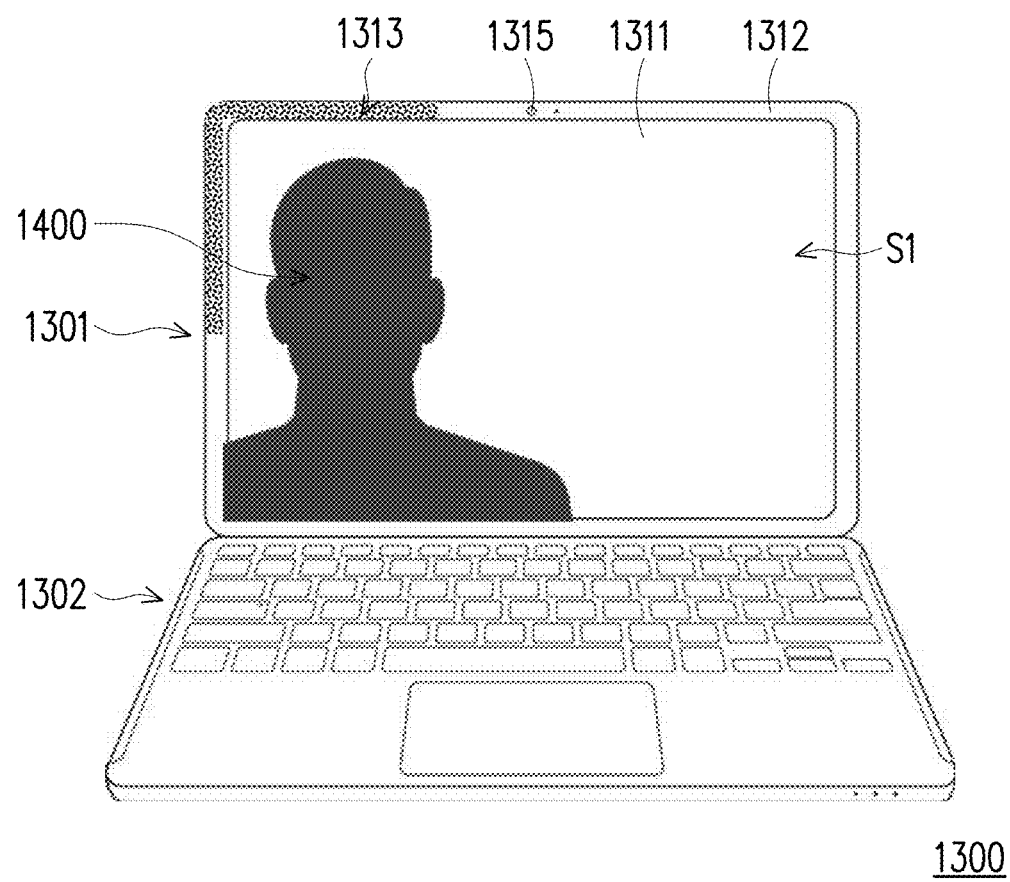
FIG. 13 is a schematic diagram of adaptively adjusting the light-emitting position of the border area of the second embodiment of the invention.

FIG. 13 is a schematic diagram of adaptively adjusting the light-emitting position of the border area of the second embodiment of the invention. Referring to FIG. 13, an electronic device 1300 includes a first body 1301 and a second body 1302. The first surface S1 of the first body 1301 includes a screen area 1311 and a border area 1312. When the electronic device 1300 turns on the auxiliary lighting function, the light-emitting module may provide an auxiliary illumination light in the border area 1312. For related technical features and hardware configuration of the electronic device 1300 of the present embodiment, please refer to the description of the embodiment of FIG. 1A, FIG. 1B, and FIG. 10, which is not repeated herein. In the present embodiment, the electronic device 1300 further includes a sensor 1315 (which may be an imaging element or a specially designed face detector). The sensor 1315 is coupled to the processing module of the electronic device 1300 and is disposed in the border area 1312 of the first body 1301.

In the present embodiment, the sensor 1315 may sense the object position of a facial object located in front of the first surface S1 of the first body 1301, such as a human face, so that the display picture may display a corresponding character image 1400. It is worth noting that the processing module of the electronic device 1300 may dynamically adjust the luminous intensity (luminous brightness) distribution of the light-emitting module in the border area 1312 according to the object position. As shown in FIG. 13, when the character image 1400 of the user is shifted to one side of the display screen (that is, the face of the user is shifted to one side of the display screen), the processing module of the electronic device 1300 may correspondingly strengthen (or reduce) the luminous intensity of the auxiliary illumination light provided by the light-emitting module in a partial area 1313 of the border area 1312.

Figure 14:
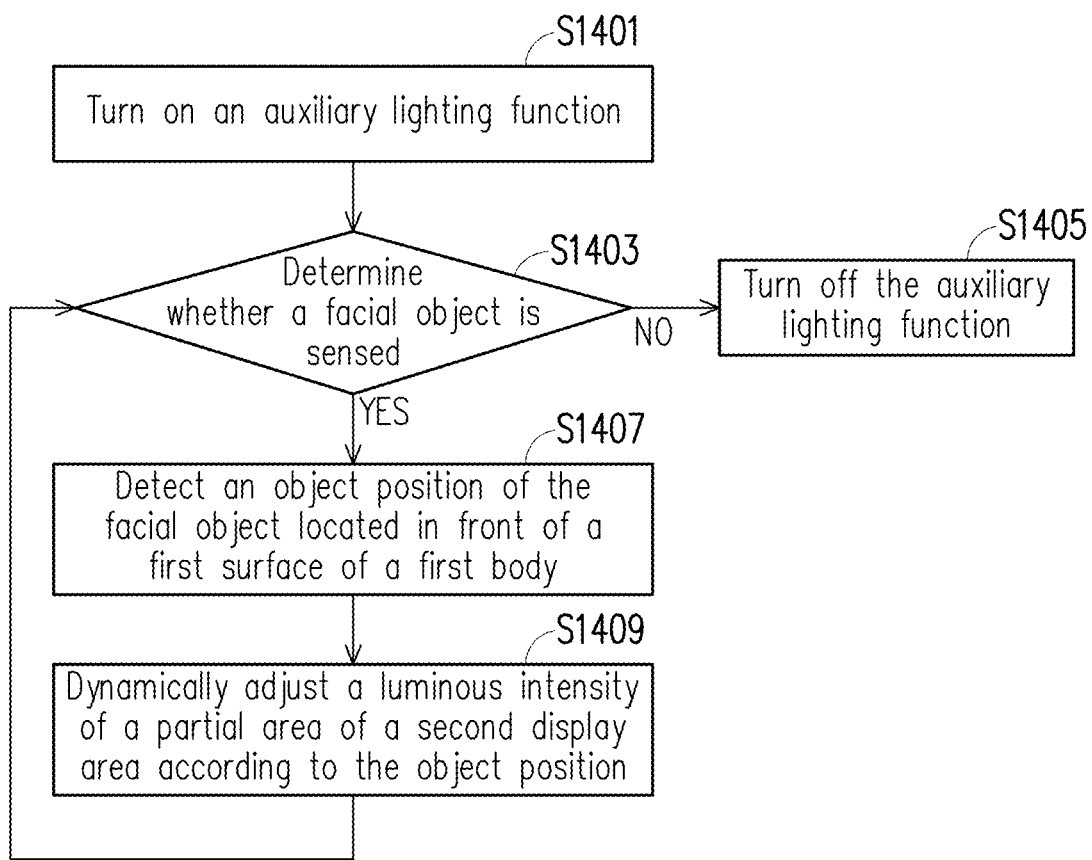
FIG. 14 is a flowchart of another operation method of the border area of the second embodiment of the invention.

FIG. 14 is a flowchart of another operation method of the border area of the second embodiment of the invention, which is similar to the embodiment of FIG. 6 and is suitable for the adjustment means of the first and second power supply modes. Referring to FIG. 13 and FIG. 14, the processing module of the electronic device 1300 may perform the following steps S1401 to S1409 to implement the tracking of the face position of the user to provide an adaptive auxiliary lighting function. In step S1401, the processing module of the electronic device 1300 turns on the auxiliary lighting function. The processing module of the electronic device 1300 may, for example, perform the above first power supply mode (as shown in FIG. 5A) or the second power supply mode (as shown in FIG. 5B). In step S1403, the processing module of the electronic device 1300 determines whether a facial object is sensed. The processing module of the electronic device 1300 may be sensed via the sensor 1315. If the determination in step S1403 is "No", then in step S1405, the processing module of the electronic device 1300 may turn off the auxiliary lighting function. If the determination in step S1403 is "Yes", then in step S1407, the processing module of the electronic device 1300 may sense the facial object position located in front of the first surface of the first body. In step S1409, the processing module of the electronic device 1300 may dynamically adjust the luminous intensity of the partial area of the second display area according to the object position. In addition, the processing module of the electronic device 1300 may perform step S1403 again according to a preset time interval. Therefore, the operation method and the electronic device 1300 of the present embodiment may provide an adaptive auxiliary lighting function by tracking the position of the face of the user, and may also achieve the effect of power saving (for the first power supply mode).

Based on the above, the electronic device with auxiliary lighting function and the operation method thereof of the invention may automatically perform the auxiliary lighting function according to the battery power so that the display screen of the electronic device is automatically divided into a portion to provide auxiliary illumination light, or the auxiliary illumination light may be automatically emitted via the light-emitting module attached in the border area. Moreover, the electronic device of the invention may dynamically adjust the brightness, light-emitting position, light-emitting area, and light-emitting configuration of the auxiliary illumination light according to the amount of battery power, so as to provide an adaptive auxiliary lighting effect to allow the user to have a good user experience in the process of operating the electronic device.

Although the invention has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

What is claimed is:

1. An electronic device with an auxiliary lighting function, comprising:
    a first body having a first surface;
    a light emitter located on the first surface of the first body; and
    a processor coupled to the light emitter and used to determine an operation of a first power supply mode or a second power supply mode according to a current power supply state,
    wherein when the processor is operated in the first power supply mode, the processor dynamically adjusts a brightness of an auxiliary illumination light provided by the light emitter according to an amount of a battery power,
    wherein when the processor is operated in the second power supply mode, in response to a sensing result being a distance sensing result, the processor dynamically adjusts the brightness of the auxiliary illumination light provided by the light emitter,
    wherein when the current power supply state is that the electronic device is powered by an internal power source, the processor is operated in the first power supply mode,
    wherein when the current power supply state is that the electronic device is powered by an external power source, the processor is operated in the second power supply mode,
    wherein when the processor is operated in the second power supply mode, in response to the sensing result being an ambient light result or a portrait ambient light result, a first intensity value of the ambient light result or a second intensity value of the portrait ambient light result is inversely proportional to the brightness of the auxiliary illumination light.

2. The electronic device of claim 1, wherein when the processor is operated in the second power supply mode, in response to the sensing result being the distance sensing result, the brightness of the auxiliary illumination light is proportional to a distance value of the distance sensing result.

3. The electronic device of claim 1, wherein when the processor is operated in the first power supply mode, the processor dynamically adjusts the brightness of the auxiliary illumination light provided by the light emitter according to the amount of the battery power and in conjunction with the ambient light result or the portrait ambient light result.

4. The electronic device of claim 1, wherein the light emitter is a portion of a display screen, and the display screen is disposed in a screen area of the first body,
wherein the display screen comprises a first display area and a second display area, and the second display area surrounds the first display area,
wherein the first display area of the display screen provides a display picture, and the second display area of the display screen provides the auxiliary illumination light.

5. The electronic device of claim 4, wherein when the processor is operated in the first power supply mode and determines that the amount of the battery power is lower than a first power ratio, the processor controls the light emitter to be turned off.

6. The electronic device of claim 5, wherein when the processor is operated in the first power supply mode and determines that the amount of the battery power is higher or equal to the first power ratio, an area of the second display area is proportional to the amount of the battery power.

7. The electronic device of claim 5, wherein when the processor is operated in the first power supply mode and determines that the amount of the battery power is higher or equal to the first power ratio, a number of arrangement positions of the second display area is proportional to the amount of the battery power.

8. The electronic device of claim 4, further comprising:
a sensor coupled to the processor and disposed in a border area of the first body,
wherein the sensor is used for sensing an object position of a facial object located in front of the first surface of the first body, and the processor dynamically adjusts a luminous intensity of a partial area of the second display area according to the object position,
wherein when the sensor does not sense the facial object, the processor controls the light emitter to be turned off.

9. The electronic device of claim 1, further comprising:
a display screen coupled to the processor and disposed in a screen area of the first body,
wherein the light emitter is disposed in a border area of the first body, and the border area surrounds the screen area.

10. The electronic device of claim 9, wherein when the processor is operated in the first power supply mode and determines that the amount of the battery power is lower than a first power ratio, the processor controls the light emitter to be turned off.

11. The electronic device of claim 10, wherein when the processor is operated in the first power supply mode and determines that the amount of the battery power is higher or equal to the first power ratio, a light-emitting ratio of a plurality of light-emitting units in the light emitter is proportional to the amount of the battery power.

12. The electronic device of claim 10, wherein when the processor is operated in the first power supply mode and determines that the amount of the battery power is higher or equal to the first power ratio, a number of a light-emitting area of a plurality of light-emitting units in the light emitter is proportional to the amount of the battery power.

13. The electronic device of claim 9, wherein when the processor is operated in the second power supply mode, in response to the sensing result being the distance sensing result, a light-emitting ratio of a plurality of light-emitting units of the light emitter is proportional to a distance value of the distance sensing result.

14. The electronic device of claim 9, further comprising:
a sensor coupled to the processor and disposed in a border area of the first body,
wherein the sensor is used for sensing an object position of a facial object located in front of the first surface of the first body, and the processor dynamically adjusts a luminous intensity of the light emitter in a partial area in the border area according to the object position,
wherein when the sensor does not sense the facial object, the processor controls the light emitter to be turned off.

15. An operation method suitable for an electronic device with an auxiliary lighting function, wherein the electronic device comprises a first body, a light emitter, and a processor, wherein the operation method comprises:
determining to operate a first power supply mode or a second power supply mode according to a current power supply state via the processor;
dynamically adjusting a brightness of an auxiliary illumination light provided by the light emitter according to an amount of a battery power via the processor when the processor is operated in the first power supply mode; and
in response to a sensing result being a distance sensing result, dynamically adjusting the brightness of the auxiliary illumination light provided by the light emitter according to the sensing result via the processor when the processor is operated in the second power supply mode,
wherein the step of determining the operation of the first power supply mode or the second power supply mode according to the current power supply state via the processor comprises:
operating in the first power supply mode via the processor when the current power supply state is that the electronic device is powered by an internal power source; and
operating in the second power supply mode via the processor when the current power supply state is that the electronic device is powered by an external power source,
wherein when the processor is operated in the second power supply mode, in response to the sensing result being an ambient light result or a portrait ambient light result, a first intensity value of the ambient light result or a second intensity value of the portrait ambient light result is inversely proportional to the brightness of the auxiliary illumination light.

16. The operation method of claim 15, wherein when the processor is operated in the second power supply mode, in response to the sensing result being the distance sensing result, the brightness of the auxiliary illumination light is proportional to a distance value of the distance sensing result.

17. The operation method of claim 15, wherein when the processor is operated in the first power supply mode, the operation method further comprises:
dynamically adjusting the brightness of the auxiliary illumination light provided by the light emitter according to the amount of the battery power via the processor and in conjunction with the ambient light result or the portrait ambient light result.

18. The operation method of claim 15, wherein the light emitter is a portion of a display screen, and the display screen is disposed in a screen area of the first body,
wherein the display screen comprises a first display area and a second display area, and the second display area surrounds the first display area, wherein the first display area of the display screen provides a display picture, and the second display area of the display screen provides the auxiliary illumination light.

19. The operation method of claim 18, wherein when the processor is operated in the first power supply mode and determines that the amount of the battery power is lower than a first power ratio, the processor controls the light emitter to be turned off.

20. The operation method of claim 19, wherein when the processor is operated in the first power supply mode and determines that the amount of the battery power s higher or equal to the first power ratio, an area of the second display area is proportional to the amount of the battery power.

21. The operation method of claim 19, wherein when the processor is operated in the first power supply mode and determines that the amount of the battery power is higher or equal to the first power ratio, a number of arrangement positions of the second display area is proportional to the amount of the battery power.

22. The operation method of claim 18, wherein the electronic device further comprises a sensor, and the sensor is disposed in a border area of the first body, wherein the operation method further comprises:
sensing an object position of a facial object located in front of a first surface of the first body via a sensor;
dynamically adjusting a luminous intensity of a partial area of the second display area according to the object position via the processor; and
controlling the light emitter to be turned off via the processor when the sensor does not sense the facial object.

23. The operation method of claim 15, wherein the electronic device further comprises a display screen, and the display screen is disposed in a screen area of the first body, wherein the light emitter is disposed in a border area of the first body, and the border area surrounds the screen area.

24. The operation method of claim 23, wherein when the processor is operated in the first power supply mode and determines that the amount of the battery power is lower than a first power ratio, the processor controls the light emitter to be turned off.

25. The operation method of claim 24, wherein when the processor is operated in the first power supply mode and determines that the amount of the battery power is higher or equal to the first power ratio, a light-emitting ratio of a plurality of light-emitting units of the light emitter is proportional to the amount of the battery power.

26. The operation method of claim 24, wherein when the processor is operated in the first power supply mode and determines that the amount of the battery power is higher or equal to the first power ratio, a number of a light-emitting area of a plurality of light-emitting units in the light emitter is proportional to the amount of the battery power.

27. The operation method of claim 23, wherein when the processor is operated in the second power supply mode, in response to the sensing result being the distance sensing result, wherein a light-emitting ratio of a plurality of light-emitting units of the light emitter is proportional to a distance value of the distance sensing result.

28. The operation method of claim 23, wherein the electronic device further comprises a sensor, and the sensor is disposed in a border area of the first body, wherein the operation method further comprises:
sensing an object position of a facial object located in front of the first surface of the first body via the sensor;
dynamically adjusting a luminous intensity of the light emitter in a partial area in the border area according to the object position via the processor; and
controlling the light emitter to be turned off via the processor when the sensor does not sense the facial object.

* * * * *